United States Patent [19]

Davis et al.

[11] 4,406,459

[45] Sep. 27, 1983

[54] OIL WEEPAGE RETURN FOR CARBON SEAL PLATES

[75] Inventors: Joseph Davis, Vernon; Donald D. Sidat, Willimantic, both of Conn.

[73] Assignee: United Technologies Corporation, Hartford, Conn.

[21] Appl. No.: 390,002

[22] Filed: Jun. 18, 1982

[51] Int. Cl.³ .................... F16J 15/16; F16J 15/42
[52] U.S. Cl. .................................. 277/25; 277/74; 277/75
[58] Field of Search ............... 277/13, 14, 15, 25, 277/74, 77, 79, 78, 75

[56] References Cited

U.S. PATENT DOCUMENTS

| | | | |
|---|---|---|---|
| 1,876,515 | 9/1932 | Emmet | 277/74 |
| 2,494,971 | 1/1950 | Summers | 277/25 |
| 2,990,202 | 6/1961 | Dennison | 277/74 |
| 2,992,842 | 7/1961 | Sheuchenko et al. | 277/25 |
| 3,347,553 | 10/1967 | Schweiger | 277/7 4 |
| 3,685,838 | 8/1972 | Malmstrom | 277/75 |

Primary Examiner—Robert I. Smith
Attorney, Agent, or Firm—Charles A. Warren

[57] ABSTRACT

A carbon seal for the bearing compartment for a gas turbine engine has radially extending passages in the rotating seal plate so arranged as to pump oil by centrifugal force from the space between the seal plate and the shaft into the bearing compartment surrounding the seal. With this seal plate no detrimental oil accumulation is permitted in this space.

5 Claims, 3 Drawing Figures

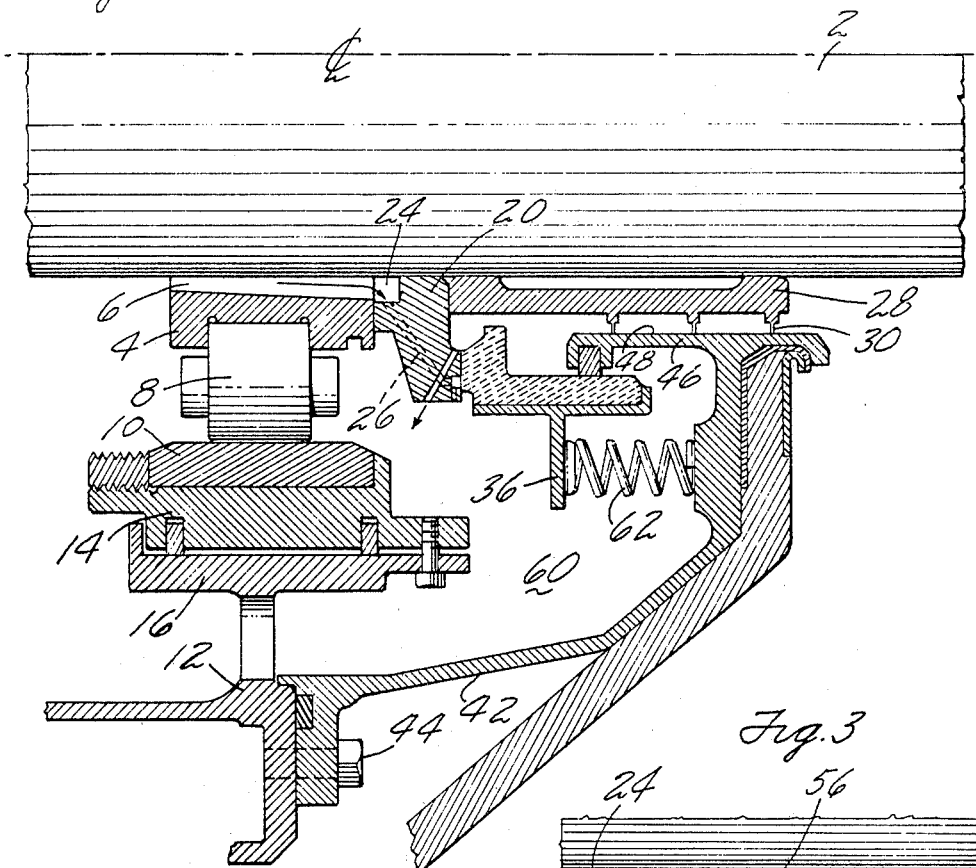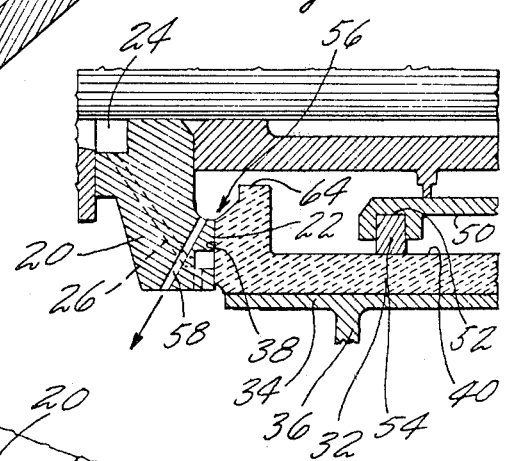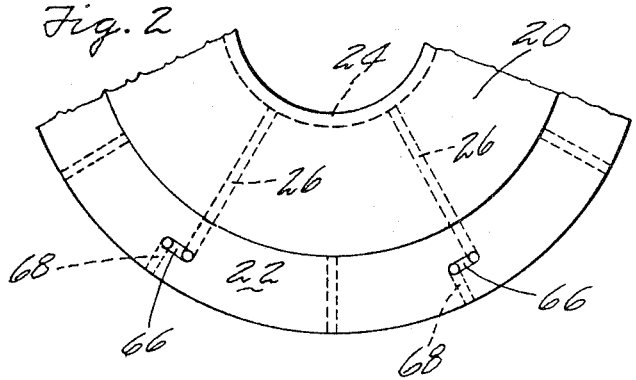

OIL WEEPAGE RETURN FOR CARBON SEAL PLATES

DESCRIPTION

1. Technical Field

In a carbon seal construction, the oil that weeps or escapes radially inward from the lubricated seal/plate interface is trapped between the fixed seal element and rotating seal plate and is forced back by centrifugal force to the bearing compartment surrounding the seal.

2. Background Art

In a gas turbine engine the bearing compartment surrounding the bearing is sealed around the shaft by various types of seals, one of which is a wet face carbon seal in which a ring or carbon seal plate mounted on the shaft and rotating with it has a radial face engaging a fixed carbon seal element that is held axially against the ring by springs and air pressure. The cooperating faces on the ring and carbon seal are lubricated to minimize friction and wear.

Some of the oil that is used for wetting the face of the carbon seal weeps out from the cooperating sealing faces into the space between the seal and the shaft on which the seal is mounted. This oil must be removed and various techniques are used for its removal. It would be desirable to have the oil flow directly from the space into the bearing compartment surrounding the seal since oil is scavenged from this compartment. It is also desirable that the flow from the space into the bearing compartment occur without any mechanical devices for causing the oil flow.

DISCLOSURE OF INVENTION

A feature of the invention is the use of drainage holes, positioned in the seal plate, providing oil passages from the space between the seal and the shaft into the bearing compartment. These holes are positioned to cause a flow of oil by centrifugal force into the compartment.

Another feature is the configuration of the seal element to create a collecting groove with which the passages communicate for effective removal of the oil.

According to the invention, the seal plate (which is normally on the shaft, and rotates with it, and which has oil supply passages therein for supplying oil to the mating faces on the seal ring and the mating cooperating fixed seal element) also has other passages therein extending from a step in the face of the seal plate positioned radially inward from the fixed carbon of the face through the sealing plate to the outer periphery of the seal plate. As the engine operates, the rotation of the seal plate creates a centrifugal force on oil entering these passages to pump the oil outwardly into the bearing compartment that surrounds the seal. The seal element is contoured so as to create an annular groove at the inner edge of the sealing surface in which the oil collects and with which the escape passages communicate.

The foregoing and other objects, features and advantages of the present invention will become more apparent in the light of the following detailed description of preferred embodiments thereof as shown in the accompanying drawing.

BRIEF DESCRIPTION OF THE DRAWINGS

FIG. 1 is a sectional view through a bearing and seal assembly showing the invention.

FIG. 2 is a plan view of a portion of the seal plate showing the oil passages therein.

FIG. 3 is an enlarged view of a detail.

BEST MODE FOR CARRYING OUT THE INVENTION

The invention is shown as applied to a gas turbine engine in which there is a shaft 2 connecting the compressor blading and the turbine blading. Mounted on the shaft is an inner bearing race 4 having a plurality of axial grooves 6 therein for delivering oil to the seal plate. Bearing elements 8 are positioned between the inner race 4 and an outer race 10 and the outer race is supported from a bearing support 12 through a damping ring 14 located between the outer race 10 and a cylindrical portion 16 as a support.

Also mounted on the shaft at the end of the inner race is a seal plate 20 that has a radial sealing face 22 near its periphery. A notch 24 in the bore of the plate is located at the end of the grooves 6 to receive and transmit lubricant from these grooves to the seal plate oil passages 26 therein extending through the seal plate from the notch 24 to the sealing face 22. These passages have a radial component so that centrifugal force, as the engine operates, pumps oil from the notch to and against the sealing face for lubricating it.

The seal ring is clamped on the shaft between the inner race 4 and a sleeve 28 which has sealing fins 30 on its outer periphery. Suitable means, not shown, hold these three elements securely on the shaft so that they are in fixed position axially on the shaft and rotate with it.

Cooperating with the seal plate 20 is an annular carbon seal element 32 carried in a sleeve 34 having a flange 36 thereon and having a radial sealing face 38 cooperating with the seal plate face 22. This element has a cylindrical inner surface 40 the diameter of which is preferably about the same diameter as the mid-portion of the sealing face 38.

The seal element 32 is supported in position around the shaft by a support housing 42 secured as by bolts 44 to the bearing support 12 and having a cylindrical portion 46, the inner surface 48 of which is closely spaced relative to the sealing fins 30 and the outer surface 50 of which has a groove 52 to receive a piston ring 54 in engagement with the surface 40 of the carbon seal element. In this way the axial movement of the carbon seal element is permitted so that the sealing faces may be held in contact with each other with the assistance of axial springs 62.

The seal plate 20 and the carbon seal element 32 are so shaped at the inner edges of the cooperating sealing surfaces as to form a groove 56 at this location to receive any leakage of oil from between the mating surfaces. The seal plate also has several oblique passages 58 therein extending from the base at the groove to the outer periphery of the seal ring thus communicating with the bearing compartment 60 surrounding the seal. This compartment is scavenged during engine operation to remove any oil collecting therein. The inner edge of the carbon seal element 64 is so located radially inward of the seal plate oil passage groove 56 that a centrifugal pumping head can be developed to return oil to the bearing compartment.

In operation high pressure sealing air is supplied to the right of the seal fins 30 and this high pressure air works past these fins into the space between the carbon seal element and the sleeve 28 and this pressure plus springs holds the carbon seal element against the seal plate to keep the sealing faces in contact.

Oil is also supplied to the end of the groove 6 and is forced along the grooves by centrifugal force since the outer surfaces of the grooves slant away from the axis of the shaft in a direction of the seal ring. Thus oil entering the groove 6 is carried by centrifugal force to and through the passages 26 and lubricates the mating sealing surfaces. Oil weeping from the mating surfaces into the groove 56 is pumped out by centrifugal force acting in the passage 58 and discharged into the bearing compartment. It will be understood that this action is possible even though there is pressure in the bearing compartment. This pressure is not routinely as high as that supplied to the seal fins. The passages 58 are obviously circumferentially spaced from the passages 26 as shown in FIG. 2 so they do not intersect. Further, the passages 58 are so arranged by size and number that hot air leakage into the bearing compartment is minimized, with the leakage air directed into, and quenched by the discharge from the oil lubricating passages 26.

The oil in the passages 26 is used to cool the seal plate as well as to lubricate the seal faces. To accomplish this an adequate flow of oil must be provided. The ends of the passages 26 at the seal face terminate in short circumferential grooves 66. These grooves in turn communicate with radial passages 68 leading into the bearing compartment. In this way there is a continuous flow of oil through passages, grooves 66 and passages 68 for cooling purposes, the oil in the grooves 66 serving to lubricate the seal surfaces.

Although the invention has been shown and described with respect to preferred embodiments thereof, it should be understood by those skilled in the art that other various changes and omissions in the form and detail thereof may be made therein without departing from the spirt and the scope of the invention.

We claim:

1. A carbon seal for a shaft bearing including:
   a seal plate for the shaft having a radial sealing surface and rotating with the shaft;
   a cooperating carbon seal element having a cooperating radial sealing surface, said surfaces being in interfacial contact, said plate and element being shaped to form a notch at the inner edges of the sealing surfaces; and
   a passage through said plate from said notch at a point inward of the inner edges of the sealing surfaces to the outer periphery of the plate for pumping oil by centrifugal force from the space inward of the sealing surfaces.

2. A carbon seal as in claim 1 in which the seal plate has other passages therein for supplying oil to the sealing surfaces.

3. A carbon seal as in claim 2 in which there are a plurality of the pumping passages circumferentially spaced apart and circumferentially offset of the lubricating passages.

4. A carbon seal as in claim 1 in which the carbon seal element is axially movable to hold the sealing surfaces in contact.

5. A carbon seal as in claim 1 in which the seal is located within a bearing compartment and the passage discharges into said compartment.

* * * * *